United States Patent [19]
Holcomb et al.

[11] 3,773,051
[45] Nov. 20, 1973

[54] METHOD AND APPARATUS FOR STIMULATION OF BODY TISSUE

[75] Inventors: Wade G. Holcomb, New Haven; James F. Hogan, Orange; William W. L. Glenn, West Haven, all of Conn.

[73] Assignee: Research Corporation, New York, N.Y.

[22] Filed: Mar. 1, 1972

[21] Appl. No.: 230,693

Related U.S. Application Data

[63] Continuation of Ser. No. 873,851, Nov. 4, 1969, abandoned.

[52] U.S. Cl. ............................. 128/422, 307/264
[51] Int. Cl. .................................................. A61n 1/38
[58] Field of Search ................... 128/419 C, 419 E, 128/419 P, 419 R, 421, 422, 423; 307/235, 264; 328/115, 135, 146

[56] References Cited
UNITED STATES PATENTS

| | | | |
|---|---|---|---|
| 2,664,880 | 1/1954 | Wales, Jr. | 128/423 |
| 2,700,975 | 2/1955 | Hopfinger et al. | 128/423 |
| 3,426,748 | 2/1969 | Bowers | 128/419 P |
| 3,563,247 | 2/1971 | Bowers | 128/419 P |
| 3,593,718 | 7/1971 | Krasher et al. | 128/419 P |
| 3,667,477 | 6/1972 | Susset et al. | 128/419 E |

OTHER PUBLICATIONS
Eisenberg et al. "Transactions on Medical Electronics, I.R.E." V. BME 8, No. 4, October, 1961 pp. 253-257.

*Primary Examiner*—William E. Kamm
*Attorney*—Brumbaugh, Graves, Donahue & Raymond

[57] ABSTRACT

A system and method for the controlled stimulation of body tissue. The system includes a transmitter, arranged externally to the body, and a receiver implanted within the body and electrically coupled to the tissue to be stimulated. The transmitter is operative to generate a series of radio-frequency energy pulses, each of a prescribed duration. The receiver functions to detect these energy pulses and, in response to the receipt of each energy pulse, to apply at least one electrical pulse of prescribed amplitude and fixed duration to the body tissue. The duration of the radio-frequency energy pulses determines the amplitude of the electrical pulses applied to the tissue. These electrical pulses are preferably produced as pulses of constant current so that the current flow in the body tissue will be independent of the tissue resistance. In addition, these electrical pulses are preferably produced with alternating polarity so as to minimize the possibility of tissue damage.

25 Claims, 5 Drawing Figures

FIG. 1
(EXTERNAL UNIT)

FIG. 2
(INTERNAL UNIT)

INVENTORS.
WADE G. HOLCOMB,
JAMES F. HOGAN &
WILLIAM W. L. GLENN

BY Brumbaugh, Graves
Donohue & Raymond
their ATTORNEYS.

FIG. 3

FIG. 4
(PULSE ALTERNATOR)

FIG. 5

METHOD AND APPARATUS FOR STIMULATION OF BODY TISSUE

This is a continuation, division, of application Ser. No. 873,851 filed Nov. 4, 1969, now abandoned.

BACKGROUND OF THE INVENTION

The present invention relates to a system and method for the controlled stimulation of body tissue, and more particularly, to such a system comprising a radio-frequency energy transmitter arranged externally to the body and a radio-frequency energy receiver implanted within the body and electrically coupled to the tissue to be stimulated.

The invention described herein was made during the course of work performed under a grant or award from the United Stated Department of Health, Education and Welfare (HEW).

In recent years, a variety of electronic devices have come into use to provide controlled stimulation of organs or elements of the human body, such as the heart, the brain, and the phrenic nerve. Perhaps the best known of these devices is the so-called "cardiac pacemaker" which applies electrical pulses to the ventricles of the user's heart to stimulate a heartbeat. One form of such device is carried externally of the body and connected to the skin, but the better known type is implanted within the body and connected directly to the heart.

The externally carried device has the advantage of being readily accessible for adjustment of amplitude, duration and rate of the stimulating pulses, as well as replacement of batteries and repair. However, this type of device can be connected directly to the heart tissue only during surgical operations or, in cases of protracted use, by means of wires passing through the body wall. The implantable device, on the other hand, has the disadvantage of requiring surgery to adjust the pulse parameters, to replace the battery or to discontinue its operation (e.g., in the event of recovery of the patient or to obtain an electrocardiogram).

Another known type of tissure stimulator attempts to combine the advantages of both the external and the implantable devices, but suffers from other disadvantages. Such a system comprises an external unit supplying pulses to a coil arranged on the surface of the patient's skin. Implanted within the patient's body is another coil which receives the pulses by induction and applies them via suitable leads to the heart. This system suffers the disadvantage that small changes in the distance between the external and the internal coils caused by normal body movements varies the inductive coupling of the coils and consequently alters the size and shape of the pulses applied to the tissue. This, of course, seriously affects the reliability of the device.

In contrast to the heart, which may respond properly to stimulation by pulses having a wide range of amplitudes and durations, other electrically responsive organic systems are more sensitive to the characteristics of the stimulating impulse. The phrenic nerve, for example, which controls movement of the diaphragm, can be electrically stimulated to induce artificial respiration. However, to achieve spontaneous respiration, the electrical stimulus must be in the form of a series of electrical pulses of increasing strength during the period of inspiration followed by an absence of pulses during the period of expiration. This rather complicated pulse signal is necessary since the phrenic nerve causes the diaphragm to contract in direct proportion to the strength of the electrical impulses applied. During the inspiration period, therefore, the diaphragm will be caused to contract in a natural manner only by application of pulses of the proper amplitude.

Devices for stimulating brain tissue are also known in the art. As in the case of the phrenic nerve, proper electrical stimulation of the brain requires precise control of the applied electrical signals. Experiments in the stimulation of brain tissue have led to the discovery, further, that tissue damage may result from the application of certain types of electrical signals and it has been shown that reversal of current direction in successive pulses minimizes possible damage.

The shortcomings of presently known types of stimulation devices, described above, are even more acute where precise control of the stimulus applied to the tissue is required, such as in the case of the phrenic nerve or the brain.

SUMMARY OF THE INVENTION

The principal object of the present invention is to provide a system and a method for the precisely controlled electrical stimulation of body tissue which avoids the shortcomings and disadvantages of the various techniques of the prior art.

Another object of the present invention is to provide apparatus for the controlled electrical stimulation of body tissue which may be connected directly to the tissue without passing wires through the body wall.

A further object of the present invention is to provide apparatus for the controlled electrical stimulation of body tissue which may be adjusted or interrupted at will without surgically piercing the body wall.

A further object of the present invention is to provide apparatus for the controlled electrical stimulation of body tissue requiring no batteries to be implanted within the body.

A further object of the present invention is to provide a system for the controlled electrical stimulation of body tissue comprising an adjustable control unit arranged externally to the body as well as a slave unit, implanted within the body and connected to directly stimulate the tissue, which enables the electrical pulses applied to the tissue to be accurately controlled notwithstanding small variations in the distance between the external and the implanted units.

Briefly, the foregoing objects are achieved, according to the present invention, by providing a transmitter, arranged externally to the body, for generating radio-frequency energy pulses of a prescribed duration, and a receiver, implanted within the body and electrically coupled to the tissue to be stimulated, for applying to the tissue an electrical pulse or pulses of prescribed amplitude and duration in response to a transmitted pulse.

The utilization of radio-frequency (RF) energy to couple the transmitter and receiver, makes possible the use of small antenna coils in both transmitter and receiver and reduces the criticality of their relative orientation.

The transmitter is encoded to generate pulses whose duration, rather than amplitude, establishes the precise stimulus characteristic to be applied to the tissue. Consequently, variation in coupling between transmitter and receiver do not affect the information content of the transmitted signal.

The duration of the RF pulses is used to control the amplitude of the electrical pulses applied to the tissue. In particular, the receiver means functions to apply to the tissue a stimulating pulse or series of pulses of fixed duration but of an amplitude proportional to the duration of the transmitted RF pulse.

The receiver may be powered by a battery, but preferably it derives all of its power solely from the transmitted RF energy. The implanted receiver device accordingly can be made smaller in size using well known "integrated circuit" techniques and, once implanted, the receiver will never endanger the patient's life by battery failure or necessitate surgery for battery replacement.

The receiver circuit is constructed to apply what is essentially a constant current pulse to the body tissue. This is preferable in most cases to a voltage pulse since the resultant electrical stimulation is independent of the tissue resistance. Once a receiver unit is implanted and connected to the tissue to be stimulated, the tissue resistance tends to increase in time due to the development of scar tissue around the connecting electrodes. The application of current pulses ensures uniform stimulation over extended periods of time in spite of the changing electrical conditions.

In a modification of the present invention the receiver device is provided with an electronic switch connected to its electrical pulse producing output stage for alternating the polarity of successive ones of the stimulating electrical pulses. This arrangement thus reduces the possibility of tissue damage caused by a unidirectional flow of current.

DESCRIPTION OF THE PREFERRED EMBODIMENTS

The apparatus according to the invention comprises a first unit carried externally of the body ("external unit") for generating RF energy pulses of a prescribed duration and a second unit implanted within the body ("internal unit") for applying a current pulse to the body tissue in response to the receipt of each transmitted energy pulse. The internal unit functions to produce and apply each current pulse immediately after the receipt of a corresponding energy pulse and the amplitude of each current pulse is made directly proportional to the duration of its corresponding energy pulse. It will be seen then, that the apparatus of the present invention employs pulse duration modulation in a system comprising a transmitter and receiver to control the amplitude of current pulses applied to the tissue to be stimulated.

In the particular embodiment to be described, the apparatus is adapted specifically for stimulation of the phrenic nerve; however the principles of operation of this apparatus are applicable to stimulation of other tissue as well. The function of the external unit, in a phrenic nerve stimulation system, is to supply a succession of RF energy pulses of prescribed duration, such that a series of electrical pulses of proper amplitude will be applied to the tissue. Such an external unit is shown in block form in FIG. 1.

Figure 1:
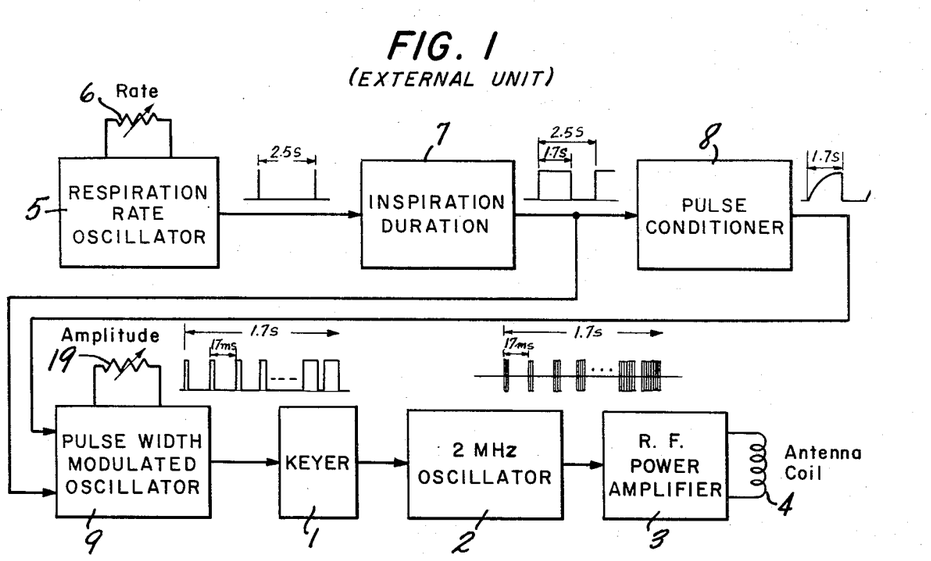
FIG. 1 is a block diagram of an externally carried RF energy transmitter unit, according to a preferred embodiment of the present invention, of the system for controlled stimulation of body tissue.

As illustrated in FIG. 1, the external RF energy transmitter comprises a keyer 1, an oscillator 2 and an RF power amplifier 3 connected to an antenna coil 4. The keyer 1 acts as an electronic switch to turn on the oscillator 2, causing it to oscillate at a frequency, for example, of 2 MHz. The output of the oscillator is consequently a series of 2 MHz bursts, at prescribed intervals and of a prescribed duration, which are amplified by the power amplifier 3 and converted into bursts of RF energy at the antenna coil 4.

The term "RF energy" as used herein should be understood to include inductive and even capacitive coupling energy as well as radiation. In particular, in the preferred embodiment of the present invention the "H" or magnetic field component of the energy emitted by the transmitter antenna is made much larger than the "E" or electric field component. This type of transmission, which is in the nature of transformer action, permits a greater transfer of energy to the receiver, at least over the short distances (e.g., in the order of 3 inches) which are encountered in this transmitter-receiver system.

The radio frequencies which may be employed in the present invention preferably lie in the range of 300 KHz – 3 MHz. With frequencies above 4 or 5 MHz the losses in the body wall increase sharply and prevent the efficient transmission of energy to the receiver implant. With frequencies below the radio-frequency range, the antenna coils must be made unduly large.

In order to effect artificial respiration by the electrical stimulation of the phrenic nerve, it is necessary to apply a series of electrical pulses which increase in accordance with a prescribed function during the period of inspiration. Immediately following the period of inspiration these pulses should cease temporarily to permit the diaphragm to relax and force inhaled air out of the lungs. A structure for generating RF energy pulses which will effect this type of stimulus is included in the circuit of FIG. 1.

Pulse generator 5 produces pulses at a repetition rate equal to the desired respiration rate of the patient. The pulse rate may be varied by potentiometer 6 to adjust the respiration stimulus in accordance with the patient's physiological requirements. For purposes of example, the pulse generator 5 is shown to supply pulses spaced 2.5 seconds apart, which corresponds to a normal respiration rate for an average person.

The pulse generator 5 is connected to a monostable multivibrator 7 which produces a pulse of prescribed duration upon receipt of each input pulse from the pulse generator 5. The duration of the output pulses from the device 7 defines the inspiration period of the patient; in this example, this period is fixed at 1.7 seconds.

The output of the monostable multivibrator 7 is passed to a pulse-shaping device 8 which produces a pulse that defines the movements of the patient's diaphragm. Experiments in electrophrenic respiration have shown that the phrenic nerve will contract the diaphragm is direct proportion to the amplitude of the stimulating electrical pulses. Accordingly, the pulse-shaping device 8 is designed to produce an output pulse which effectively describes the time-position response of the diaphragm. Like the diaphragm, the output pulse should change its level quickly at first, then more slowly as it approaches its peak value. The pulse should then drop abruptly to its initial value during the period of expiration of the patient to permit the diaphragm to relax of its own accord. The required pulse shape may be simply approximated, in this case, by integration of the pulses produced by the monostable multivibrator 7.

The pulse-shaping device 8 is connected, in turn, to a pulse width modulated oscillator 9. This oscillator produces a succession of output pulses of widths proportional to the amplitude of the input signal from the pulse-shaping device 8. The constant of proportionality is made variable in this case by the potentiometer 19 designated "Amplitude." This amplitude refers to the amplitude of the current pulses produced by the internal unit which effects the stimulation of the tissue. Thus, in the electrophrenic stimulator herein described, this amplitude controls the amount of contraction of the diaphragm.

The pulse width modulated oscillator 9 generates pulses at the appropriate frequency which will produce the desired physiological effects without fatiguing the tissue to be stimulated. If the period between the pulses is long, the tissue to be stimulated will recover between applications of an electrical pulse and will accordingly react strongly to each pulse. As the period between pulses is decreased, the tissue will exhibit a lessened and accordingly more controlled response to the stimulus. If the pulse period is decreased too far, the tissue cannot sustain its response without fatigue. A pulse period of 17 milliseconds has been chosen in the instant example; however, this period may prove in practice to be too high or too low, and should be adjusted to suit the physiological requirements of the particular patient.

Since the external unit is designed to be carried about by the patient, it is desirable to conserve the battery energy where possible to reduce the size and weight of the power supply without increasing the frequency with which the batteries must be replaced. To this end, the pulse produced by the monostable multivibrator 7 is utilized to switch on the battery power to the pulse-width modulated oscillator 9 during the inspiration period only. The inspiration duration pulse can also clearly be used to switch the battery power to other circuit elements as well.

Figure 2:
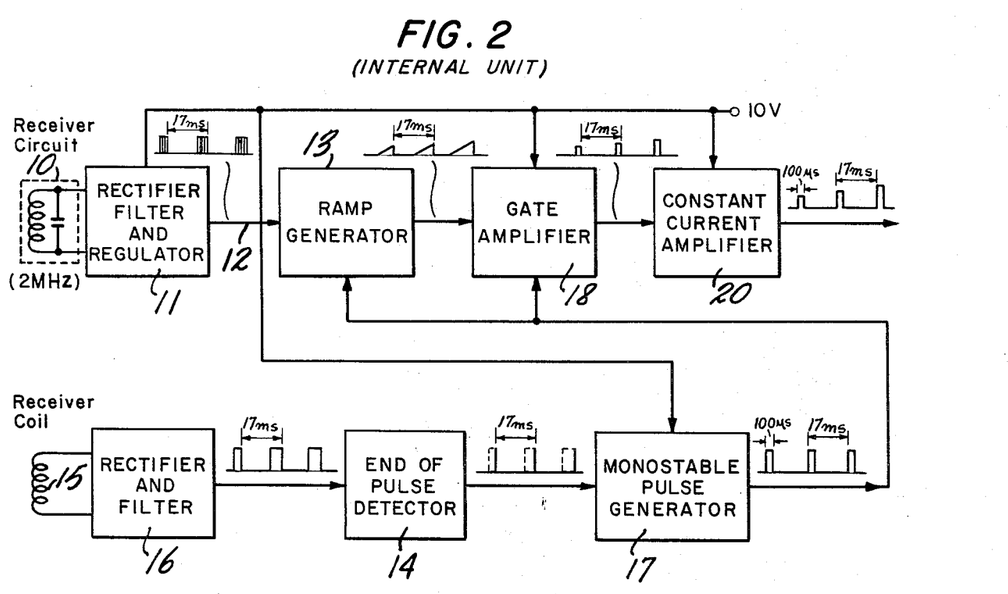
FIG. 2 is a block diagram of an implanted receiver unit, according to a preferred embodiment of the present invention, suitable for use with the transmitter unit of FIG. 1.

FIG. 2 shows the internal unit employed with the electrophrenic respiration apparatus of the present invention. Although it may be powered by its own separate battery, it is preferable and is disclosed herein as being powered solely by the RF energy transmitted by the external unit.

The internal unit includes a receiver antenna circuit 10 shown as a high "Q" parallel LC circuit tuned to the frequency, 2 MHz., of the energy transmitted by the external unit. The electrical energy received by the circuit 10 is passed to rectifier, filter and regulator 11 which functions as the power supply for the internal unit. As shown in FIG. 2, the device 11 produces a 10-volt DC output as well as a full wave rectified, but unfiltered output 12.

The output 12 of the rectifier, filter and regulator 11 is connected to a ramp generator 13 which produces sawtooth-shaped pulses whose amplitudes are proportional to the durations of the respective received RF energy pulses. As will be discussed in greater detail below, upon the termination of each RF energy pulse, the ramp voltage will be applied to the output stage of the internal unit to determine the amplitude of the electrical pulse applied to the body tissue.

In accordance with a particular feature of the present invention, the internal unit operates to apply a pulse to the body tissue upon termination of a received pulse of RF energy. Accordingly, the internal unit is provided with an "end-of-pulse detector" 14, which produces a short pulse at the end of each RF pulse received by a second receiver antenna coil 15 and converted to a positive pulse by a rectifier and filter device 16. Unlike the receiver circuit 10, the receiver coil 15 is an untuned low impendence winding; such a winding has been found in practice to deliver a sufficient signal for the operation of the end-of-pulse detector.

The output of the end-of-pulse detector 14 is supplied to a monostable multivibrator 17 which produces an output pulse of 100 microsecond duration upon receipt of each input pulse. Although the end-of-pulse detector 14 requires no power for it operation, the pulse generator device 17 receives its operating power from the rectifier, filter and regulator 11. The output pulse produced by the pulse generator device 17 is used to reset the ramp generator 13 at the termination of the 100 microsecond pulse period. This permits the ramp generator to again produce a ramp of voltage beginning from the zero voltage point upon recepit of the next energy pulse.

The output of the pulse generator device 17 is also passed to a gate amplifier 18 which gates the instantaneous output voltage of the ramp generator 13 to the final stage of the internal unit, the constant current amplifier 20. This output stage supplies to the tissue to be stimulated a constant current pulse of fixed duration and of an amplitude prescribed by the instantaneous voltage of the ramp generator 13 received through the gate amplifier 18. Since the gate amplifier is switched by the 100 microsecond pulse produced by the monostable pulse generator 17, the current pulse produced by the output stage 20 will likewise be 100 microseconds in duration. Like the pulse repetition rate, this pulse duration is determined by the physiological requirements of the tissue to be stimulated and is designated herein as 100 microseconds for the purposes of example only.

Figure 3:
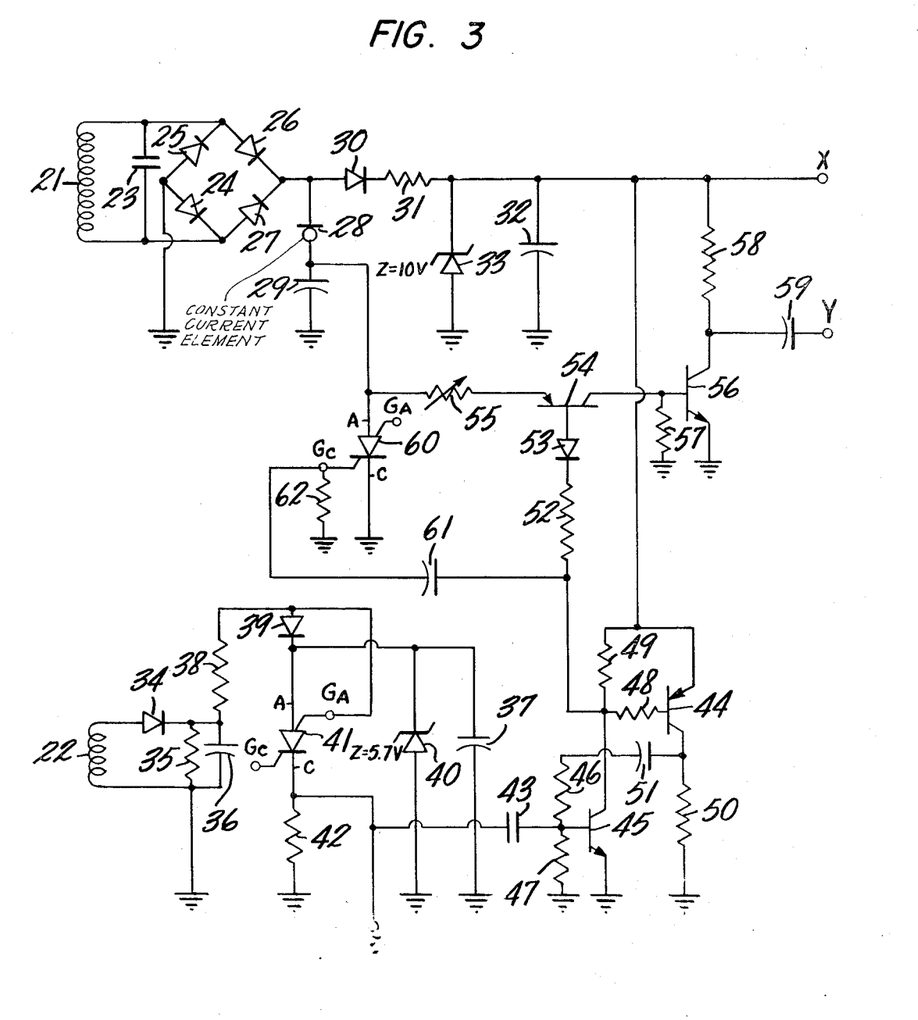
FIG. 3 is a schematic diagram of the receiver unit shown in FIG. 2.

The internal unit shown in block form in FIG. 2 is illustrated schematically in FIG. 3. This circuit is intended to be enclosed in an hermetically sealed case and implanted beneath the skin of the body wall. Electrodes, connected to the output terminals X and Y, are attached by surgery to the tissue to be electrically stimulated. As described above, the circuit of FIG. 3 functions to apply current pulses of controlled amplitude and fixed duration to these tissue electrodes.

The circuit of FIG. 3 includes an antenna consisting of two windings 21 and 22. The winding 21 exhibits the higher impedance and, together with a capacitor 23 arranged in parallel, forms a high "Q" circuit having a resonant frequency of 2 MHz. A full wave rectifier, formed of diodes 24–27, is connected across this resonant circuit to supply a DC voltage to the field effect constant current device 28 which is in series with a capacitor 29. In addition, the DC voltage is applied via the diode 30 and resistor 31 to a storage capacitor 32; the voltage developed across 32 is clamped by means of a Zener device 33 to 10 volts.

The coil 22 is of low impedance and for the purposes of the present circuit, need not be tuned. The current induced in this coil is rectified by a diode 34 and develops a DC pulse across the resistor 35 and capacitor 36. This pulse charges the capacitor 37 through the resistor 38 and diode 39. The voltage across the capacitor 37 is clamped by the Zener device 40 to 5.7 volts.

When the RF energy ceases to be received, and the pulse applied to the resistor 35 and capacitor 36 terminates, the four-layer diode 41 loses its $G_A$ voltage. Since the capacitor 37 is connected to the anode A of the device 41, the latter will conduct heavily until the capacitor 37 is discharged through the resistor 42. The resulting pulse, which will be short if the resistance of 42 is sufficiently small, is applied through the blocking capacitor 43 to a monostable 100 microsecond pulse generator.

The monostable circuit consists of a PNP and an NPN transistor, 44 and 45, respectively; five resistors 46–50 and a capacitor 51. This circuit is of conventional design and its operation will not be described in detail here. It should be noted, however, that the circuit receives its operating voltages from the stored energy 10 volt circuit and functions, when triggered, to apply a 100 microsecond pulse through a resistor 52 and diode 53 to turn on a gate transistor 54.

The transistor 54 allows the capacitor 29 to discharge for 100 microseconds through a resistor 55 into the base of an output transistor 56. The base current is therefore determined by the instantaneous voltage appearing across the capacitor 29. Since for each value of base current applied to the output transistor a well-defined collector current will flow, the base current determines the collector current. In addition, since over a wide range the collector current in a transistor common emitter circuit is independent of the collector voltage, the current flowing through a tissue load connected to the terminals X and Y can be considered constant. Therefore, variations in the tissue resistance caused by the development of scar tissue around the tissue electrodes will not vary the electrical stimulus applied to the tissue.

To complete the output circuit, the transistor 56 is provided with bias resistors 57 and 58 are a blocking capacitor 59 to inhibit the flow of direct current through the tissue. The maximum current applied to the tissue may be varied by adjusting the resistor 55 in the final stages of circuit assembly. It has been determined in practice that a 3 milliampere output (maximum) is sufficient for stimulation of the phrenic nerve.

The four-layer diode 60 is an electronic switch which conducts on the trailing edge of the 100 microsecond pulse formed by the monostable pulse generator. This pulse is applied through the blocking capacitor 61 across the resistor 62. The electronic switch completely discharges the capacitor 29 so that this capacitor may be charged from a zero state upon receipt of the next burst of RF energy.

It has been shown that brain tissue, for example, can be damaged by the application of a uni-directional current and also that tissue damage can be reduced by alternately reversing the current in successive pulses. To provide this capability when necessary, additional circuitry may be provided between the output terminals X and Y and the tissue, which circuitry functions as a "double pole double throw switch" to alternately reverse pulse polarity. Such pulse alternator circuitry is illustrated in FIGS. 4 and 5.

Figure 4:
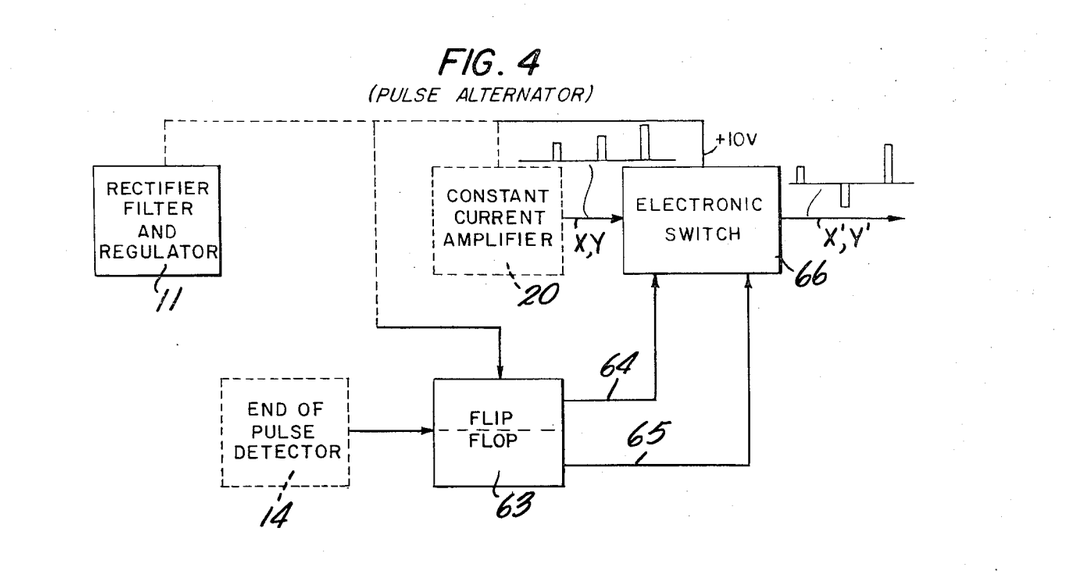
FIG. 4 is a block diagram of a pulse alternator, which may be connected to the receiver unit of FIG. 3.
Figure 5:
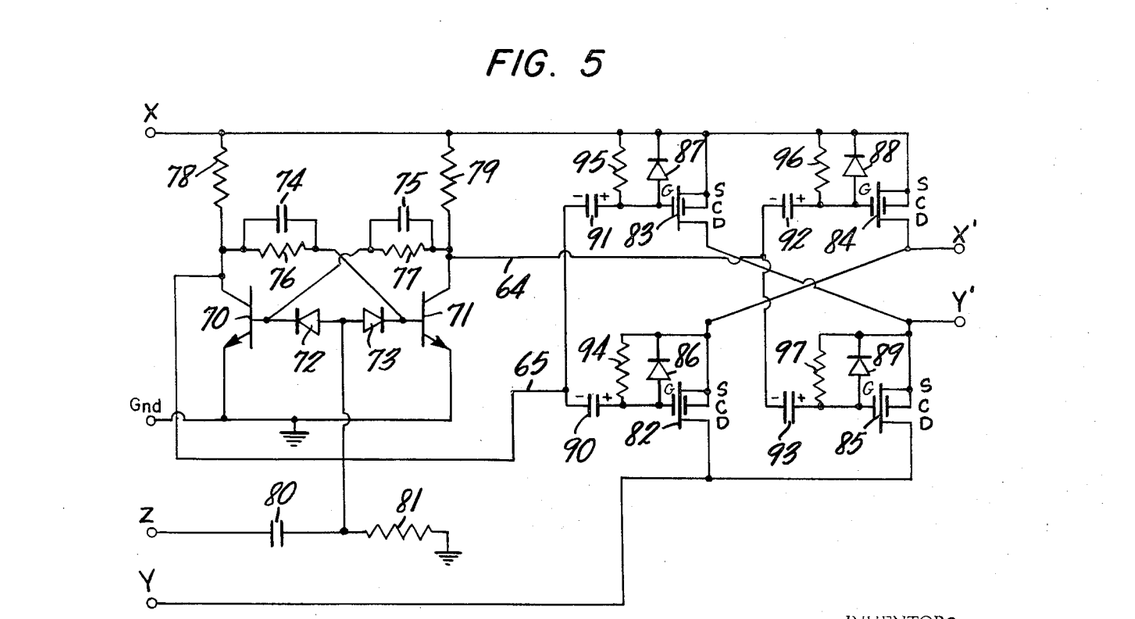
FIG. 5 is a schematic diagram of the pulse alternator shown in FIG. 4.

FIG. 4 is a block diagram showing the basic elements of the pulse alternator as well as the functional relationship of these elements with certain elements of the internal unit of FIG. 2. As shown, the pulse alternator comprises a flip-flop 63 connected to change its state upon receipt of each pulse from the end-of-pulse detector 14. The flip-flop has two outputs 64 and 65 which are connected to control an electronic switch 66. When the flip-flop is one state, a signal will appear on the output 64 and set the switch 66 to one position; when the flip-flop is in the opposite state a signal will appear on the output 65 and set the switch 66 to the other position.

Both the flip-flop 63 and the electronic switch 66 are supplied power by the rectifier, filter and regulator 11.

The electronic switch 66 functions to reverse the polarity of alternate ones of the unidirectional current pulses produced by the constant current amplifier 20. As noted above, this electronic switch can be described as a "double pole double throw switch;" that is, the switch 66 receives input pulses at two terminals X and Y and passes these pulses to two output terminals X' and Y' so that alternately X is connected to X', Y to Y', and X is connected to Y' and Y to X'.

The schematic diagram for the pulse alternator shown in FIG. 4 will now be discussed in connection with FIG. 5. Since the functional elements of the pulse alternator are well known in the art, the circuit of FIG. 5 will not be described in detail.

The pulse alternator circuit of FIG. 5 is intended to be directly connected to the circuit of the internal unit shown in FIG. 3. The output terminals X and Y of the circuit of FIG. 3 are connected to the corresponding input terminals X and Y in the circuit of FIG. 5. The terminal Z at the output of the end-of-pulse detector is connected to the corresponding input terminal Z of the pulse alternator. Finally, the circuits of FIG. 3 and FIG. 5 are provided with a common ground.

When employed to drive the pulse alternator, the circuit of FIG. 3 must be slightly modified. The stored energy of the rectifier, filter and regulator must be increased by removing the resistor 31 and increasing the capacity of the capacitor 32. The blocking capacitor 59 should also be removed from the terminal Y to provide bias for the electronic switch of the pulse alternator.

The multistable vibrator or flip-flop in the circuit of FIG. 5 is formed by the transistors 70, 71; the diodes 72, 73; capacitors 74, 75; and resistors 76–79. The trigger pulse received from the end-of-pulse detector on the terminal Z is applied to the flip-flop via the capacitor 80 across the resistor 81. The receipt of each pulse causes the flip-flop to change its state and thus to apply a voltage alternately to the output leads 64 and 65.

The output leads 64 and 65 are connected to the gates of four P-channel enhancement mode metal oxide silicon field effect transistors (MOSFETs) 82–85. The MOSFETs are normally non-conducting between their source and drain connections but if their gate connections are driven by a pulse which is of the same polarity as the drain potentials, they will conduct and provide a low-resistance path between the input terminals X, Y and the output terminals X', Y'.

The MOSFETs 82–85 thus function, together with the diodes 86–89, capacitors 90–93 and the resistors 94–97, as a double pole double throw switch. The MOSFETs are ideal for this purpose since they do not load the power source when in the non-conducting state and exhibit an extremely low resistance between their source and drain connections when they conduct. The first feature is important for the conservation of the energy received by the rectifier, filter and regulator, and the second feature minimizes the series voltage drop between the input and output terminals.

It should be understood that, although a particular embodiment of this invention has been described in detail by way of illustration, this invention includes all modifications and equivalents thereof which fall within the scope of the appended claims.

We claim:

1. A method for effecting a controlled stimulation of body tissue, comprising the steps of:
    a. producing a radio-frequency signal, pulse-modulated in a characteristic other than amplitude;
    b. transmitting said pulse-modulated radio-frequency signal outside of the body as radio-frequency energy pulses;
    c. receiving said energy pulses within the body;
    d. generating electrical pulses in response to the receipt of said energy pulses, said electrical pulses having an amplitude which is dependent upon the modulation of said energy pulses; and
    e. applying said electrical pulses to the tissue to be stimulated.

2. The method defined in claim 1, wherein said generating step includes the step of producing said electrical pulses with a prescribed current amplitude notwithstanding variations in resistance of said tissue.

3. The method defined in claim 2, wherein said generating step includes the step of producing said electrical pulses with a fixed pulse duration.

4. The method defined in claim 28, wherein said producing step includes the step of producing a pulse-duration modulated, radio-frequency signal.

5. The method defined in claim 1, wherein said generating step includes the step of producing one electrical pulse in response to the receipt of each one of said energy pulses.

6. The method defined in claim 5, wherein said generating step includes the step of producing said electrical pulses with an amplitude which depends upon the duration of respective ones of said energy pulses.

7. A system for the controlled stimulation of body tissue comprising, in combination:
    a. transmitter means, adapted to be carried externally of the body, having means for producing a radio-frequency signal that is pulse-modulated in a characteristic other than amplitude, and means for transmitting said pulse-modulated radio-frequency signal as radio-fequency energy pulses; and
    b. receiver means, adapted to be implanted within the body and to be electrically coupled to the tissue to be stimulated, for applying electrical pulses to said tissue in response to the receipt of said energy pulses from said transmitter means, said receiver means including means for generating said electrical pulses with an amplitude which is dependent upon the modulation of said energy pulses.

8. The system defined in claim 7, wherein said pulse generating means includes means for producing one electrical pulse in response to the receipt of each one of said energy pulses.

9. The system defined in claim 8, wherein said pulse producing mean produces said electrical pulses with an amplitude which is dependent upon the duration of the respective ones of said energy pulses.

10. The system defined in claim 9, wherein said pulse producing means produces said electrical pulses with an amplitude which is proportional to the duration of said respective ones of said energy pulses.

11. The system defined in claim 7, wherein said pulse generating means includes means for producing said electrical pulses as pulses of fixed duration.

12. The system defined in claim 7, wherein said pulse generating means includes means for producing said electrical pulses as current pulses.

13. The system defined in claim 7, wherein said receiver means includes means for applying said electrical pulses to said tissue immediately following termination of the receipt of said corresponding energy pulses from said transmitter means.

14. The system defined in claim 7, wherein said receiver means includes means for alternating the polarity of successive ones of said electrical pulses.

15. The system defined in claim 14, wherein said receiver means further includes means for producing said electrical pulses as constant current pulses,
    whereby said polarity alternating means reverses the current flow in successive ones of said electrical pulses.

16. A system for the controlled stimulation of body tissue comprising, in combination;
    a. transmitter means, adapted to be carried externally of the body, for generating radio-frequency energy pulses of prescribed duration; and
    b. receiver means, adapted to be implanted within the body and to be electrically coupled to the tissue to be stimulated, for applying an electrical pulse of prescribed amplitude to said tissue in response to the receipt of each transmitted energy pulse, said receiver means including:
        1. antenna means for receiving said energy pulses;
        2. ramp generator means, coupled to said antenna means, for producing an output which is proportional to the duration of each of said energy pulses;
        3. means, coupled to said antenna means, for producing a signal at the termination of each of said energy pulses;
        4. output means, coupled to said ramp generator means and said signal producing means, for applying an electrical pulse to said tissue upon receipt of said signal, said electrical pulse having an amplitude which is porportional to said output of said ramp generator means.

17. The system defined in claim 16, wherein said ramp generator means includes a circuit element for passing constant current and a capacitor connected in series, said output being the voltage across said capacitor.

18. The system defined in claim 16, wherein said signal producing means includes an end-of-pulse detector having a diode, a controlled diode and a resistor connected in series and a capacitor connected in parallel with said controlled diode and said resistor, the input signal of said end-of-pulse detector being applied to said diode and to a control terminal of said controlled diode and the output signal of said end-of-pulse detector being the voltage across said resistor.

19. The system defined in claim 16, wherein said signal producing means includes an end-of-pulse detector coupled to said antenna means and includes a monostable pulse generator coupled between said end-of-pulse detector and said output means, whereby said signal is produced for a prescribed duration and whereby said output means applies said electrical pulse for said prescribed duration.

20. For use in a system for applying controlled stimulation to body tissue, radio-frequency energy pulse receiver means adapted to be implanted within the body and to be electrically coupled to the tissue to be stimulated, said receiver means comprising, in combination:
  a. antenna means for receiving radio-frequency energy pulses;
  b. pulse producing means, coupled to said antenna means, for applying electrical pulses of variable amplitude and fixed duration to said tissue in response to the receipt of said energy pulses, said pulse producing means including first circuit means for varying the amplitude of said electrical pulses in dependence upon the duration of said energy pulses and second circuit means for fixing the duration of said electrical pulses independently of the duration of said energy pulses.

21. The receiver means defined in claim 20, wherein said first circuit means includes:
  1. ramp generator means, coupled to said antenna means, for producing an output which is proportional to the duration of each of said energy pulses, and
  2. output means, coupled to said ramp generator means, for applying an electrical pulse to said tissue upon receipt of each of said energy pulses, the amplitude of said electrical pulse being dependent upon said output of said ramp generator means.

22. The receiver means defined in claim 48, wherein said amplitude of said electrical pulse is proportional to said output of said ramp generator means.

23. The receiver means defined in claim 21, wherein said pulse producing means further includes end-of-pulse detector means, coupled between said antenna means and said output means, for producing a signal at the termination of each of said energy pulses, whereby said output means is responsive to the production of each signal by said end-of-pulse detector means to apply said electrical pulse to said tissue for said duration.

24. The receiver means defined in claim 23, wherein said second circuit means includes monostable pulse generator means, connected between said end-of-pulse detector means and said output means, for producing a signal of prescribed duration upon receipt of the signal produced by said end-of-pulse detector means, whereby said output means is responsive to the production of each signal by said monostable pulse generator means to apply said electrical pulse to said tissue for said prescribed duration.

25. The receiver means defined in claim 20, wherein said pulse producing means further includes means for alternating the polarity of successive ones of said electrical pulses.

* * * * *

PO-1050
(5/69)

UNITED STATES PATENT OFFICE
CERTIFICATE OF CORRECTION

Patent No. 3,773,051              Dated November 20, 1973

Inventor(s) Wade G. Holcomb; James F. Hogan and William W. L. Glenn

It is certified that error appears in the above-identified patent and that said Letters Patent are hereby corrected as shown below:

Col. 1, line 3, "division" should be deleted; Col. 1, lines 22 and 23, "pacemaker" should be --Pacemaker--; Col. 1, line 41, "tissure" should be --tissue--; Col. 3, line 2, "applied" should be -supplied-- Col. 5, line 3, "is" should be --in--; Col. 6, line 21 "impendence" should be --impedance--; Col. 6, line 28, "it" should be --its--; Col. 7, line 8, after "and" insert a comma (,); Col. 7, line 51, "are" should be --and--; Col. 9, line 43, "claim 28" should read --claim 1--; Col. 9, line 61, "radio-fequency" should be --radio-frequency--; Col. 10, line 8, "mean" should be --means--; and Col. 12, line 8, "claim 48" should be --claim 21--.

Signed and sealed this 23rd day of April 1974.

(SEAL)
Attest:

EDWARD M.FLETCHER,JR.
Attesting Officer

C. MARSHALL DANN
Commissioner of Patents